United States Patent [19]

Betz et al.

[11] 4,029,957

[45] June 14, 1977

[54] DETECTION DEVICE

[75] Inventors: Frans Betz; Jacobus Johannes de Haas, both of Leidschendam; Petrus Cornelis van der Kraan, Zoetermeer, all of Netherlands

[73] Assignee: De Staat der Nederlanden, te Dezen Vertegenwoordigd Door de Directeur-Generaal der Posterijen, Telegrafie en Telefonie, The Hague, Netherlands

[22] Filed: Oct. 8, 1975

[21] Appl. No.: 620,638

[30] Foreign Application Priority Data

Oct. 9, 1974 Netherlands ...................... 7413282

[52] U.S. Cl. ........................... 250/221; 250/214 B; 250/222 R

[51] Int. Cl.² ......................................... G01D 21/04

[58] Field of Search ....... 250/205, 208, 209, 214 B, 250/221, 222, 223; 178/DIG. 33

[56] References Cited

UNITED STATES PATENTS

| | | | |
|---|---|---|---|
| 3,751,667 | 8/1973 | Quittner | 250/214 B |
| 3,764,813 | 10/1973 | Clement et al. | 250/221 |
| 3,805,061 | 4/1974 | De Missimy et al. | 250/209 |
| 3,815,994 | 6/1974 | Peckham | 250/205 |
| 3,816,745 | 6/1974 | Primm et al. | 250/221 |
| 3,832,056 | 8/1974 | Shipp et al. | 250/221 |
| 3,859,518 | 1/1975 | Sander | 250/209 |

*Primary Examiner*—David C. Nelms
*Attorney, Agent, or Firm*—Hugh Adam Kirk

[57] ABSTRACT

Detection device for detecting movements by means of a source of light and a photo-detector, which device is provided with: (1) a pulse generator for supplying the source of light with a proportionally very large amount of energy during a very small part of the time; and (2) with a comparator, synchronized with the pulse generator, for comparing a signal received from the photo-detector with the preceding signal during the said time and for delivering a signal to a counter in case a difference is ascertained. The device can be utilized in a manual sorting device comprising one or more sorting-cases. Movements of the upper surface of the stack in a pigeon-hole can be detected by means of reflection. The detection devices in the pigeon-holes are connected via multiplexers and demultiplexers to a central processing unit that has been provided.

16 Claims, 6 Drawing Figures

DETECTION DEVICE

BACKGROUND OF THE INVENTION

The invention relates to a detection device for detecting movements by means of a source of light and a photo-detector.

A device of this type can be utilized e.g. at a post-office where the sorting operations are performed by hand and where it is important to know, at least approximately, the amount of sorted post for each direction. This utilization involves a number of problems of such a kind that so far a counting device that functions well has not yet been found.

The dimensions of the equipment at the entrance or in the pigeon-holes have to be as small as possible so that the sorting process and the reception capacity of the pigeon-holes will not be disturbed.

Use must be made of reflecting light, because in the case of a path of rays that can be interrupted by a letter, a letter that is too long or in a wrong position will put the device out of operation.

The device must be insensitive to differences in glosses and colours of the letters.

The device must be insensitive to moving shadows, ambient light, even when it is switched on and off, smoke, and the like.

The energy necessary for the source of light must be minimal in view of the development of heat in the small pigeon-holes, which are built together to form cases; and the contents of which, consisting of paper, are highly heat-insulating.

The device must be so sensitive that even a letter of the same colour and gloss as the topmost letter of the stack is detected when quietly laid on the stack.

SUMMARY OF THE INVENTION

The invention offers a solution which meets all the aforesaid requirements by means of a pulse generator for supplying the source of light with a proportionally very large amount of energy during a very small part of the time, and by means of a comparator, synchronized with the pulse generator, for comparing a signal received from the photo-detector with the preceding signal during the said time, and for delivering a signal to a counter in case a difference is ascertained. In the case of e.g. 1000 pulses to the second and a pulse during of 10 usec, the said very small part of the time will then be 1% of each pulse. If the current supplied without interruption to the source of light, formed by a light emitting diode, amounts to some milliamperes (mA), this current can amount to some amperes, thanks to the reduced duration according to the invention. So the uninterrupted supplying current is only a fraction of the current that passes through the source of light, in consequence of which it does not exceed some mA. Thanks to the small amount of power, an expensive power supply is not required.

In order to amplify the pulses delivered by the photocell it is necessary to have an alternating current amplifier, which generally has the advantage of having a greater stability than direct current amplifiers. Also this alternating current amplifier works as a filter by which a very good separation can be obtained between the photo-electric currents caused by the ambient light and those resulting from the light pulses. The intensity of the ambient light is no longer of importance and also the changing ambient light, with a frequency which is lower than that of the light pulses, can be distinguished rather easily. Besides, the amplifier has been programmed in such a way that it only transmits output signals at the moments when a pulse can be present. This results in the suppression of a considerable noise and disturbance.

The device preferably comprises a capacitor, the charge of which is a measure for the pulse last received from the photo-detector. A change of charge can only take place at the moments when the source of light actually emits light. In the intervals between pulses, the capacitor retains the last charge, in consequence of which it is possible to follow the rapid reflection changes properly and, at the same time, to utilize very large mark-to-space ratios. The advantage of large mark-to-space ratios is that they offer the possibility of obtaining a large production of light from the source of light by means of a rather small uninterrupted power supply current resulting in an improvement of the signal-to-noise ratio.

It is advisable to provide the power supply circuit of the source of light with a light regulator controlled by the received pulses. Alternatively, the outgoing circuit of the photo-detector can be provided with a regulator which is controlled by the received pulses, since the height of the stack or the reflection coefficient can be so large that the photo-electric current resulting from the reflection causes the amplifier to get saturated, so that a change of reflection is no longer perceived. In order to prevent this, a decrease is effected when a certain value is exceeded. If the regulation is a very strong one, the light received by the photocell in a stable state will be practically constant. The perception of a change of reflection is now no longer a perception of an absolute, but of a relative change.

The source of light is preferably formed by a diode emitting infra-red radiation. The advantage of such a source of light as compared with an incandescent lamp is, above all, that very quick light pulses can be emitted. A second advantage that could be mentioned is that no light is radiated that hinders the sorter. Further advantages are its small dimensions, its very long life, and its resistance against shocks and vibrations. It is true that the production of light in itself is small, but thanks to the very circuit according to the invention, it is considerably improved.

The invention also relates to a manual sorting device comprising one or more sorting-cases, each provided with a number of pigeon-holes. This manual sorting device is characterized by a detection device, as described above, provided in each pigeon-hole and capable of detecting movements of the upper surface of the stack in the pigeon-hole by means of reflection, said detection devices in the pigeon-holes being connected via multiplexers and demultiplexers to a central processing unit that has been provided.

BRIEF DESCRIPTION OF THE DRAWINGS

The above-mentioned and other features, objects, and advantages, and the manner of attaining them are described more specifically below by reference to an embodiment of this invention shown in the accompanying drawings, wherein:

FIG. 2 shows a diagram of a photo-diode current to the amplifier 5, which can be separated by the device in such a way that the influence of the changing ambient light (line 12) is eliminiated and that the pulses 13 of the photo-detector 4 are retained. When there is only one pulse 13 on the line 12 (see FIG. 2), higher or lower than the preceding pulses, the detector 6 will not react because of the action of the delay circuits 9 and 10. Then when a letter is put in the pigeon-hole 1, a number of pulses will be higher or lower than the preceding series of pulses which continue until the delay circuit 9 changes the intensity of the light source 3. Before this change the delay circuit 10, that may have a different delay compared with delay circuit 9, gives a pulse to a counter 39 in the central processor described later in FIG. 6. Thus the time diagram in FIG. 2 can be used to illustrate the function of the delay circuit 9. When a couple of successive pulses occur which are relatively different from the preceding series of pulses, the delay circuit 9 will act. This could be the case after the three pulses in the valley of line 12.

I — The Pulse Generator Circuits 7 and 8

Figure 3:
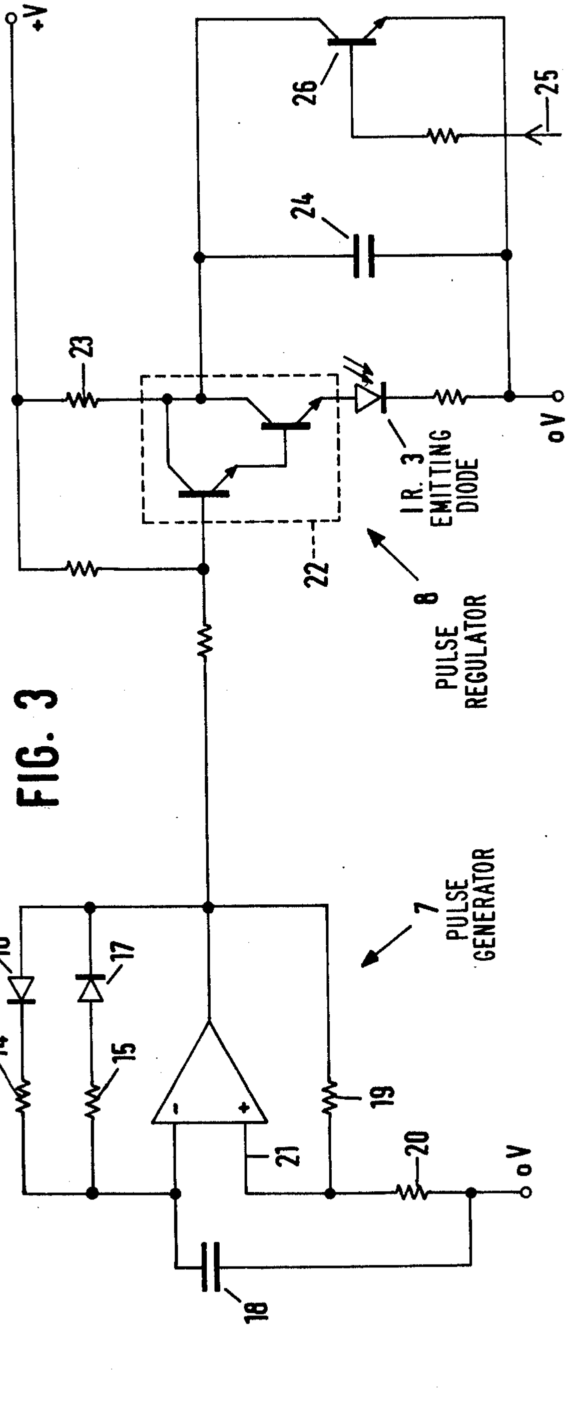
FIG. 3 is a wiring diagram of a pulse generator and control circuit for the light emitting diode shown in the blocks in the circuit of FIG. 1.

In principle the pulse generator 7 consists of a feed-back amplifier, which works as a relaxation oscillator (see FIG. 3, left-hand part). Via the resistors 14, 15 and the diodes 16, 17 the output-voltage is fed back to the input, which, in case of a sufficiently high input voltage, causes a change of potential at the output. However, the capacitor 18 ensures a delay, notably in co-operation with the resistor 14 when the output is positive with regard to the input voltage and in co-operation with the resistor 15 when the output is negative with regard to the input voltage. When the values of the resistors 14, 15 are now chosen e.g. in the ratio of 1 to 100 the RC constants will also be in the ratio of 1 to 100, so that the mark-to-space ratio (duty cycle) obtained will be 1%. The resistors 19 and 20 give a bias voltage, which changes with the output voltage, at the amplifier input 21, so that the charge of the capacitor 18 must have at least this voltage to produce a change of polarity at the output. The said bias voltage must be so low that the charging curve of the capacitor only forms the beginning of the normal RC curve. In this field the characteristic is practically linear and there is little variation in time.

As the source of light 3 is a diode which emits light in accordance with the diode current, a large amplification is necessary to obtain a strong diode current and, consequently, much light. A Darlington or composite transistor circuit 22, in which the diode is inserted in the emitter lead, is suited for the purpose (see FIG. 3, right-hand part). The collector circuit contains a resistor 23 and a decoupling capacitor 24. In the first instance the entire pulse current will be supplied by the capacitor 24, so that no pulsed load current is drawn from the power supply and the risk of crosstalk and the like via the current supply and the supply lines is avoided. The power supply charges the capacitor 24 almost continuously with a current which is equal to (marking time/spacing time $\times I_{peak}$. As stated above the photo-electric current is controlled via conductor 25. This is done by means of a transistor 26, which is connected in parallel to the Darlington circuit 22 the base current of which depends on the strength of the signal received, so that the capacitor 24 is discharged. The voltage on the Darlington circuit 22 decreases as well as the current through the diode 3.

II — The Comparator Circuit 6

Figure 4:
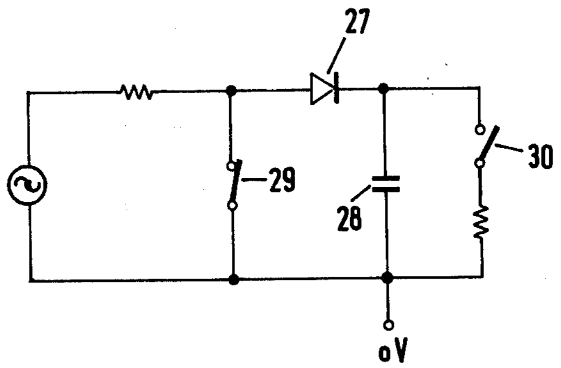
FIG. 4 is a wiring diagram of recitifier circuit similar to the comparator or difference detector shown in FIG. 1.

In principle a diode 27 and a capacitor 28 (see FIG. 4) can be utilized in the difference detector with the particular detail that the charging and discharging circuits are provided with switches 29 and 30. A change of charge can only take place at the moments when the switch 30 is closed and the switch 29 is open. The moments the switches are open and closed are determined by the pulse generator 7, which also controls the diode 3. So a change of charge can only take place at the moments when the diode 3 emits light. In the intervals the last charge is retained by the capacitor 28, which, consequently, has the function of a store. This method of synchronously switched rectification has the advantage that rapid changes can be properly followed, and offers, at the same time, the possibility of utilizing very large mark-to-space ratios. The advantage of a large mark-to-space ratio is that it offers the possibility of obtaining a large production of light from the diode 3 by means of a rather small uninterrupted power supply current resulting in an improvement of the signal-to-noise ratio.

Figure 5:
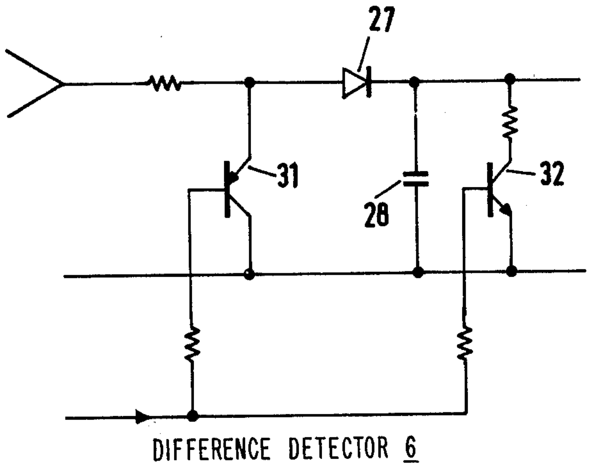
FIG. 5 is a wiring diagram of the difference detector shown in FIG. 1.

In reality the switches 29 and 30 are not utilized; they are replaced by two transistors 31, 32, which perform the same functions as the said switches (see FIG. 5).

Detailed detection differences per letter are integrated to only one single count by means of the delay circuit 10.

Figure 6:
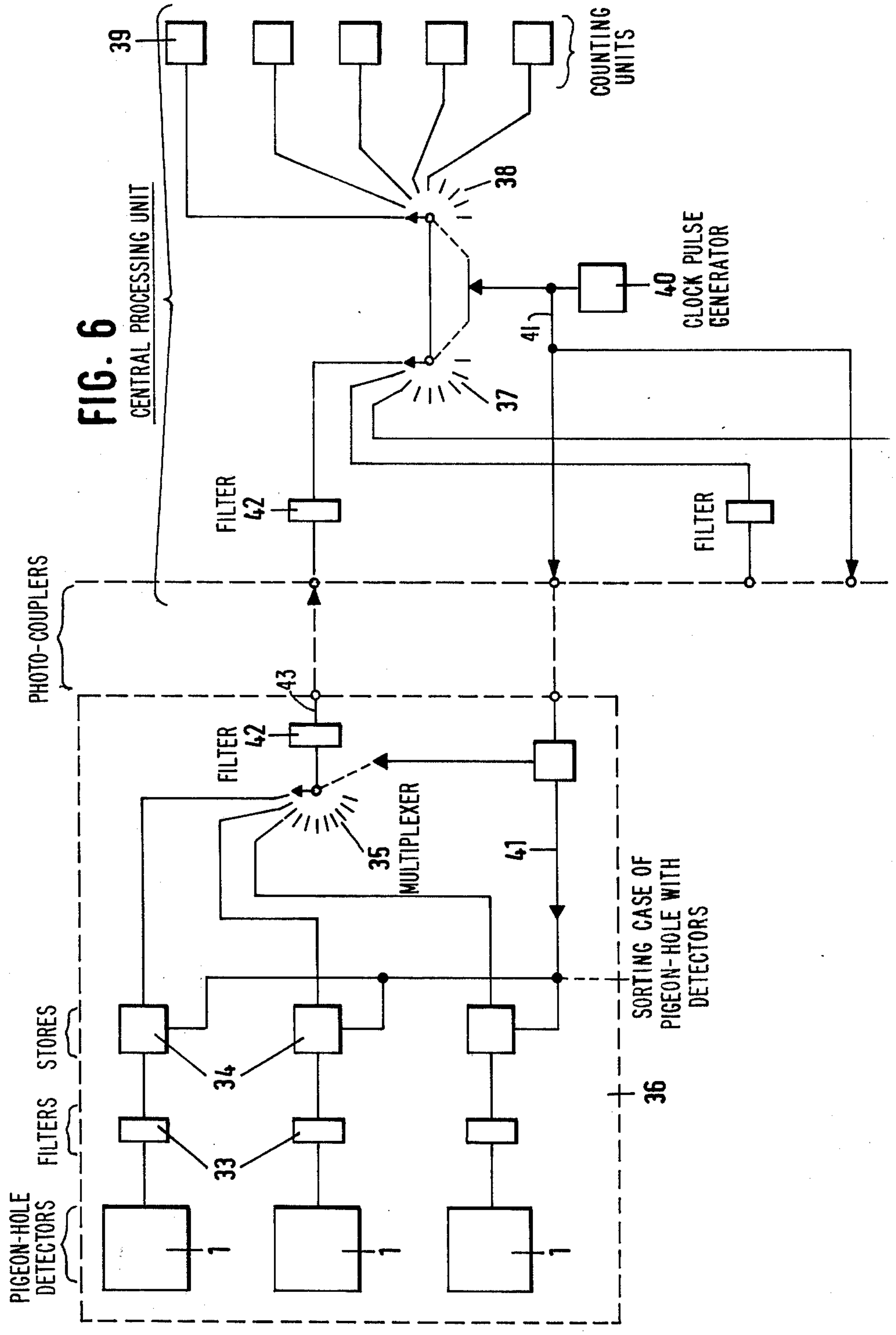
FIG. 6 is a schematic block wiring diagram of a survey circuit for collecting and processing the detector information from a plurality of cases of pigeon-holes. DETAILED DESCRIPTION OF A PREFERRED EMBODIMENT In FIG. 1,a box 2 containing inter alia a source of light 3 and a photo-detector 4 has been fixed to the upper side of each pigeon-hole 1 in a case of pigeon-holes for the manual sorting of letters. As determined by its distance from the photo-detector and by the reflection coefficient of the paper, the letter in the pigeon-hole will give a certain reflection, which determines the current carried by the photo-detector. When a next letter is thrown into the pigeon-hole, the existing reflection will change because of a possible different reflection coefficient and a different distance from the box 2. This change of reflection causes a change of the photo-detector current, which is signalled by an electronic circuit. The signals are centrally counted. So a count denotes a perception that a change of reflection has taken place, so that it is assumed that a letter has been thrown into the pigeon-hole. The photo-detector 7 is connected to an amplifier 5, the output of which leads to a comparator or difference detector 6. The amplifier 5 also works as a high-pass filter, so that a good separation is obtained between the flow of ambient light and the light pulses. This difference detector 6 operates periodically under the control of a pulse generator 7. Via a regulator 8 this pulse generator ensures the supply of energy to the source of light 3 during 1% of the time. The regulator 8 is controlled from the difference detector 6 via a delay circuit 9. Via another delay circuit 10 and an amplifier 11 the output of the difference detector 6 is led to a central processing unit. The delay circuits 9 and 10 serve to integrate the differences that quickly succeed each other. A circuit according to FIG. 1 is provided for each pigeon-hole.

III — Central Processing Unit (FIG. 6)

Figure 1:
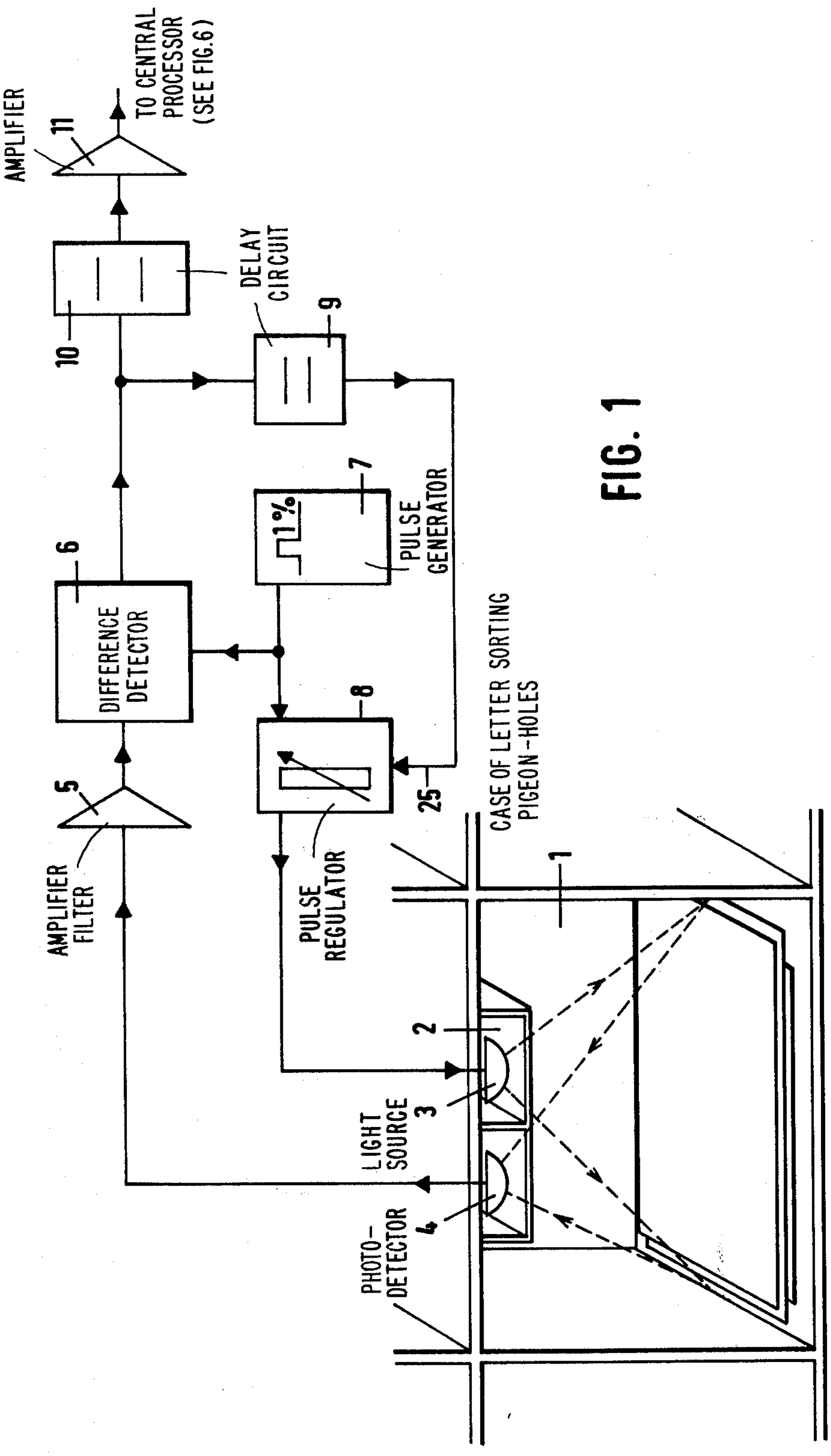
FIG. 1 is a perspective view of the open end of a pigeon-hole having a letter detector according to a preferred embodiment of this invention including a schematic block wiring diagram of its detecting circuit.
Figure 2:
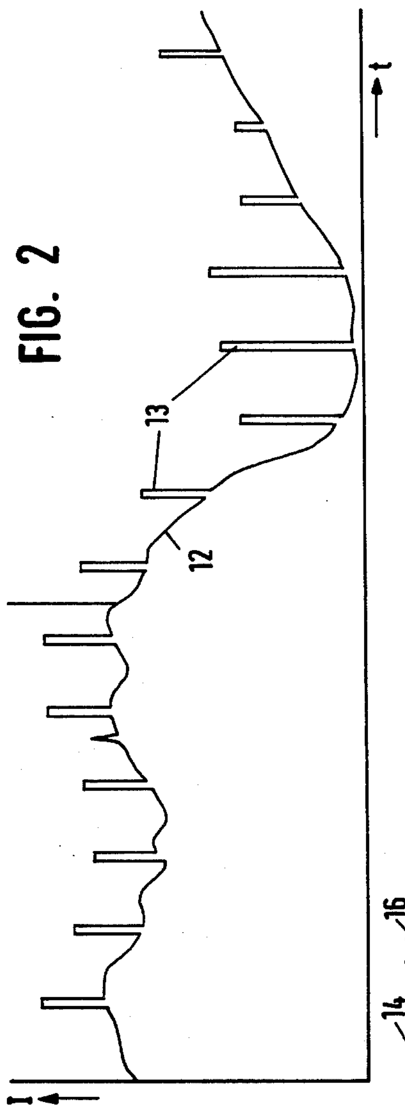
FIG. 2 is a time diagram of the current from the photo-diode shown in FIG. 1.

All the outputs of the letter detectors of FIG. 1 are led via filters 33 and stores 34 to a multiplexer 35 where they are scanned one by one. So this means a parallel-to-series conversion of the information (see FIG. 6). This conversion can be realized in a simple way by means of digital integrated circuits (IC's) specially designed for the purpose. The start and the synchronization are effected from a central point. The advantage is that for each sorting-case 36 only one wire 43 is necessary for transferring the counting information from all the pigeon-holes to the central point. This one wire 43 and other wires having the same function and coming from other sorting-cases, come together at a circuit where at each step of a multiplexer 37 the corresponding pigeon-holes of all the sorting-cases are scanned one after the other. This again is a parallel-to-series conversion, but now the output signals of the corresponding pigeon-holes of the various sorting-cases are placed one after the other. These signals are transmitted via a demultiplexer 38 to the counting unit 39 associated with the relevant pigeon-hole, which counts the number of pulses. Then the next step takes place. The number of steps is determined by the number of pigeon-holes per case and forms a cycle. The successive steps of the pigeon-hole shift register are ensured by a clock pulse from a multivibrator 40. A reset lead is indicated by 41. At the beginning of each cycle, there appears a shift load pulse, which implies the order for recording the information from stores 34 in the parallel-to-series convertor and for resetting the stores. The shift load pulse is obtained by a division of the clock pulses. The transfer of the pulses between the sorting-cases and the central counting unit takes place via photo-couplers, which cause a galvanic separation between the current supplies of the sorting-cases and the current supply of the central unit. This is considered to be necessary to obtain a certain degree of disturbance suppression. The entire counting system has been designed to allow the transfer of only low frequency signals, so that simple filters 42 on the lines ensure a disturbance-free reception.

In principle every device capable of increasing a number by 1 can be used as a counter 39, if the speed that will play a role when several sorting-cases are used is not taken into account. The use of a computer for counting and collecting information offers essential advantages. A small computer can monitor the entire counting, process the results, signal when too many or too few countings take place, record the number of sortings per unit of time, etc. When a computer has the disposal of different programs, it can be fully utilized for controlling the sorting and calculating process.

What we claim is:

1. Detection device for detecting movements by means of a source of light and a photo-detector, characterized by a pulse generator for repeatedly supplying the source of light with energy to light it during a relatively short period of time compared to the time between repetitions of pulses from said generator, and by a comparator, synchronized with said pulse generator and connected to said photo-detector responsive to light from said light source for comparing each signal received from the photo-detector with the preceding signal received therefrom during the said time and for producing a third signal in case there is a difference between said received signal and said preceding signal.

2. Detection device according to claim 1, wherein said comparator has a capacitor successively charged by each signal received from said photo-detector, which charge is compared with the last signal received from the photo-detector.

3. Detection device according to claim 1, wherein said third signal is connected to a light regulator connected to said source of energy for said light source.

4. Detection device according to claim 1 wherein said third signal is connected to a regulator.

5. Detection device according to claim 1, characterized in that the source of light is formed by a diode emitting infra-red radiation.

6. Manual sorting device comprising one or more sorting cases, each provided with a number of pigeon-holes, characterized by a detection device according to claim 1 provided per pigeon-hole, and capable of detecting movements of the uppper surface of the stack in the pigeon-hole by means of reflection, said detection devices in the pigeon-holes being connected via multiplexers and demultiplexers to a central processing unit for counting said third signals.

7. A device for measuring changes in reflectivity of objects comprising:

A. means for illuminating the objects with regularly repeated short bursts of high-energy light,
B. means for regulating said illuminating means,
C. means for sensing the reflectivity from said objects during said bursts of light,
D. means to store the sensed reflectivity from each burst until a succeeding burst is sensed and then comparing said adjacent successively sensed light bursts,
E. means for generating a signal when there is a difference between two successively sensed reflectivity bursts of light from said objects, and for conducting said signals to and for controlling said regulating means,
F. a pulse generator for controlling said regulating means and said generating means, and
G. means for counting said generated signals.

8. A device according to claim 7 wherein said illuminating means comprises an infra-red light emitting diode.

9. A device according to claim 7 wherein said regulating means comprises a Darlington circuit.

10. A device according to claim 7 wherein said sensing means comprises a photo-detector.

11. A device according to claim 7 wherein said means for comparing comprises a capacitor.

12. A device according to claim 7 wherein said pulse generator comprises a feedback relaxation oscillator circuit in which the duration of the pulse is many times shorter in time than the space between successive pulses.

13. A device according to claim 7 wherein said illuminating means and said sensing means are mounted adjacent a postal pigeon-hole for detecting changes in reflectivity from successive letters placed into said pigeon-hole.

14. A device according to claim 13 including a plurality of pigeon-holes in a case, each pigeon-hole having an illuminating and sensing means associated therewith.

15. A device according to claim 14 comprising a plurality of similar cases, and including a central processing unit in which the number of objects in the same pigeon-hole in each case is indicated.

16. A device according to claim 15 wherein said central processing unit comprises multiplexing switches for said pigeon-holes and said cases.

* * * * *